Dec. 22, 1953     A. D. GOODWIN     2,663,340
NUT HULLER AND SHELLER

Filed Jan. 8, 1952     2 Sheets-Sheet 1

INVENTOR
A. D. Goodwin

BY *Corbeter + Corbeter*
ATTORNEYS

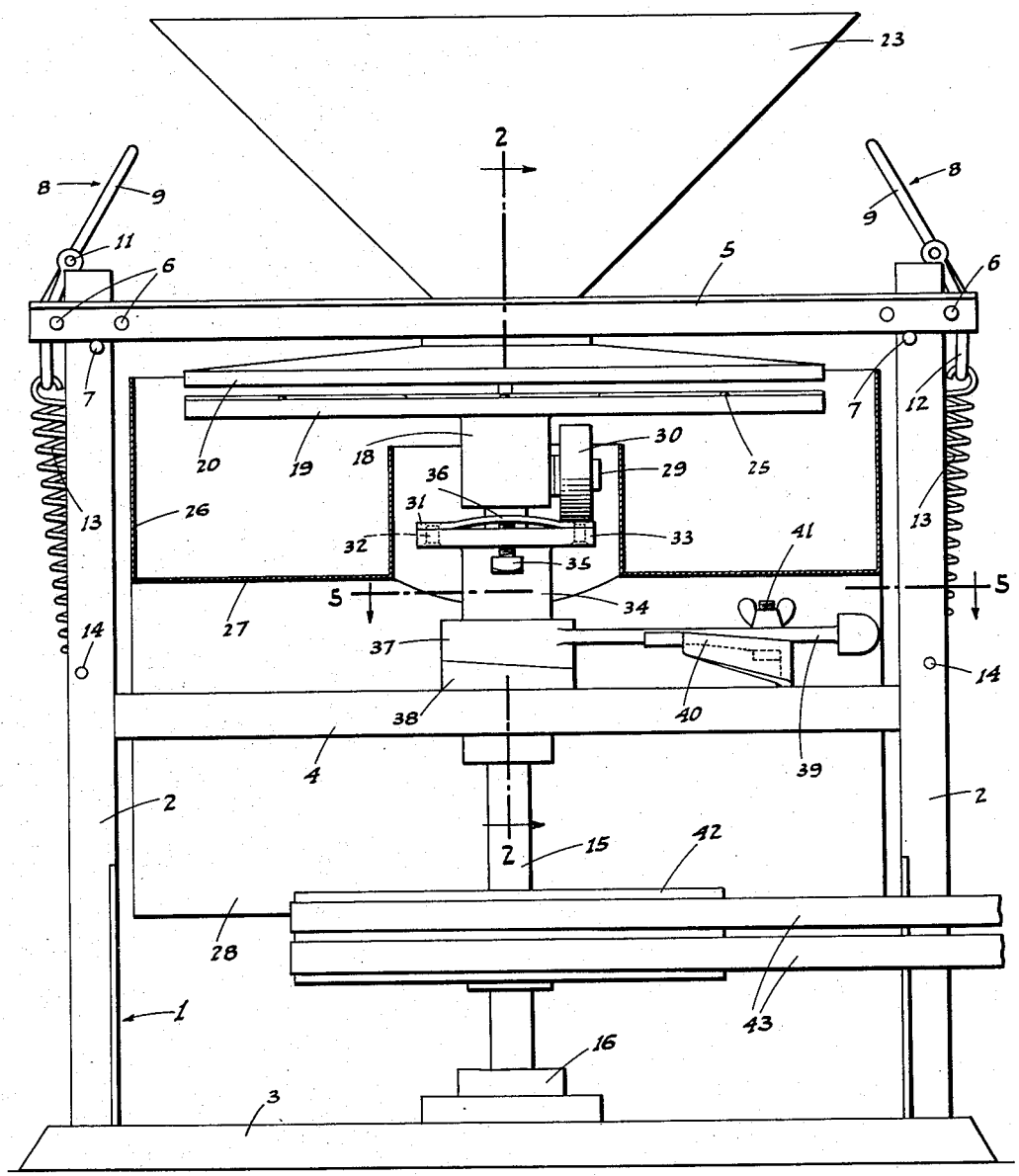

Patented Dec. 22, 1953

2,663,340

UNITED STATES PATENT OFFICE 2,663,340

NUT HULLER AND SHELLER

Alfred D. Goodwin, Manteca, Calif., assignor to A. D. Goodwin & Son, Manteca, Calif., a partnership Application January 8, 1952, Serial No. 265,439

9 Claims. (Cl. 146—11)

This invention provides, as a major object, an improved nut huller and sheller; the device being especially designed, but not limited, for use with almonds.

Another important object of the invention is to provide a nut huller and sheller which embodies, in novel assembly, cooperating upper and lower discs between which the nuts feed outwardly, from a center hopper, by centrifugal action; the adjacent or working faces of said discs converging radially outwardly to attain a progressively greater hulling or shelling pressure on the nuts as they are so fed.

An additional object of the invention is to provide a nut huller and sheller, as in the preceding paragraph, which includes novel mechanism operative to cause one of the relatively rotating discs to forcefully recurringly pulse axially; i. e. to shift toward and then retract, with respect to the other disc, whereby an effective, jaw-like nut cracking action is attained to supplement the hulling and shelling pressure occasioned by the aforesaid radial taper of the working faces of the discs.

A separate object of the invention is to provide a nut huller and sheller which includes, with cooperating discs as above, a novel device for the purpose of adjusting the axial spacing between said discs, and which adjustment is required preparatory to operation of the machine on nuts of different sizes or kinds, and whether with or without hulls thereon.

A further object is to provide a mount for the relatively rotating discs which permits one disc to yield axially away from the other to compensate for an overload, or to permit any foreign object to clear the discs without damage thereto.

It is also an object of the invention to provide a nut huller and sheller which is designed for ease and economy of manufacture; convenience of operation; and long service with a minimum of servicing or maintenance required.

Still another object of the invention is to provide a practical and reliable nut huller and sheller, and one which will be exceedingly effective for the purpose for which it is designed.

These objects are accomplished by means of such structure and relative arrangement of parts as will fully appear by a perusal of the following specification and claims.

In the drawings:

Fig. 1 is an elevation of the machine, with the catch pan in section.

Figure 2:
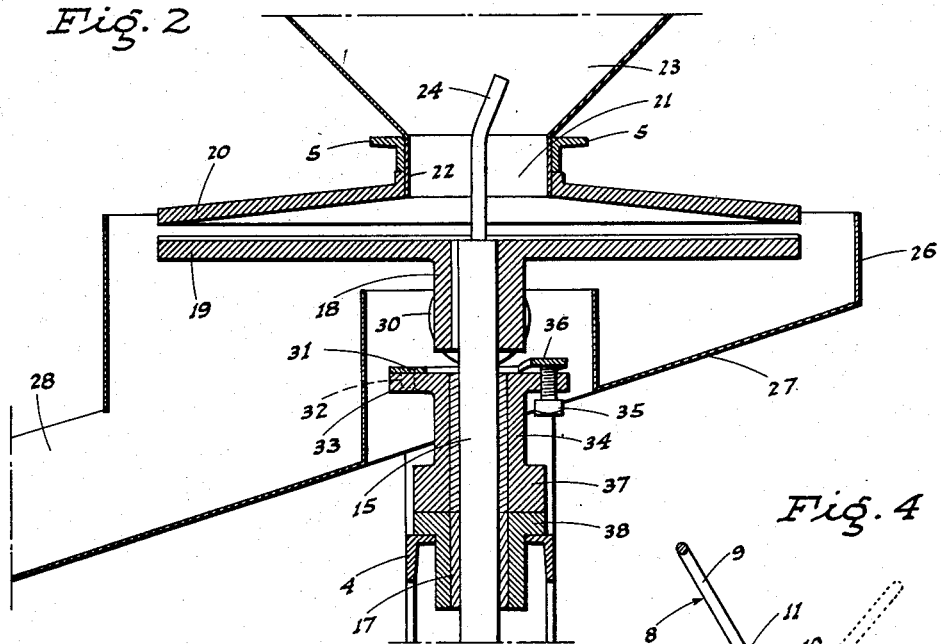
Fig. 2 is a fragmentary transverse section on line 2—2 of Fig. 1.

Referring now more particularly to the characters of reference on the drawings, the nut huller and sheller comprises an upstanding open or skeleton main frame, indicated generally at 1, such main frame including transversely spaced, upstanding end posts 2, of outwardly opening channel configuration, affixed to a base 3. An intermediate cross bar 4 extends horizontally between the posts in fixed relation, while at the top of said posts there is a pair of transversely spaced, horizontal top cross bars 5.

The cross bars 5 are rigidly connected together on opposite sides of the upper end portion of each post 2 by a pair of transverse pins 6, which pins are spaced a distance sufficient to permit said cross bars 5 to have upward yielding motion from a down or stop position resting against stop pins 7 on said posts 2.

The top cross bars 5 are normally held against the stop pins 7 by yieldable hold-down units, each indicated generally at 8, which units are disposed adjacent related ends of said cross bars and releasably engage the near one of the transverse pins 6.

Figure 4:
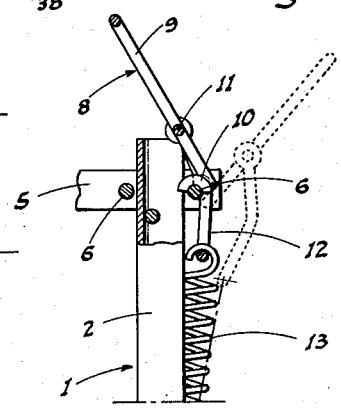
Fig. 4 is a fragmentary elevation, partly in section, showing one of the yieldable, cross bar hold down units.
Figure 3:
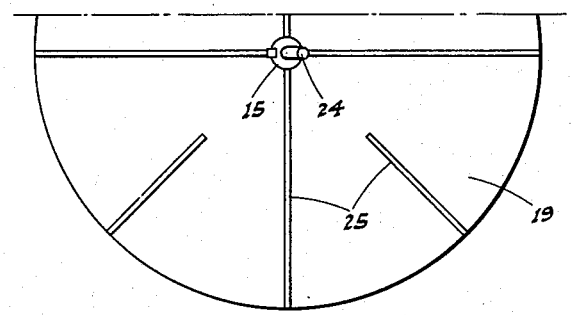
Fig. 3 is a fragmentary plan view of the lower disc, detached.
Figure 5:
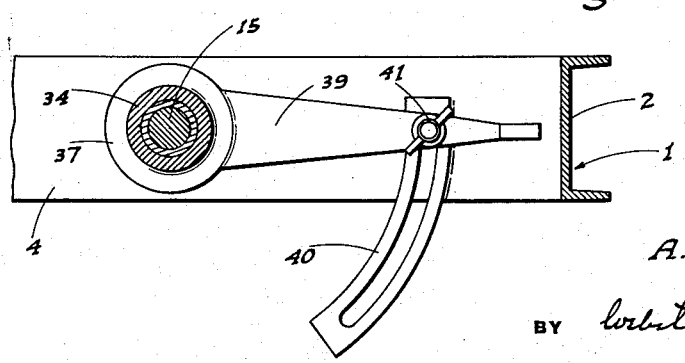
Fig. 5 is a fragmentary sectional plan on line 5—5 of Fig. 1.

Each yieldable, cross bar hold-down unit 8 comprises, as shown in detail in Fig. 4, a laterally swingable catch arm 9 having a downwardly facing hook 10 on its lower end; such catch arm 9 being pivoted, intermediate its ends, as at 11, between the upper ends of the legs of a yoke 12, which yoke is bent outwardly, intermediate its ends, as shown.

At the lower end the yoke 12 is engaged by a tension spring 13 which extends downwardly and hook-engages with a transverse pin 14 on the adjacent post 2.

The hook 10 normally engages over the near transverse pin 6, with the catch arm 9 and the yoke 12 swung inwardly to a beyond-dead-center position, as in full lines in Fig. 4.

In this position each cross bar hold-down unit 8 permits the cross bars 5 to yield upwardly against the springs 13 but holds said cross bars against escape. To release the cross bars 5 for removal from the posts 2 when necessary, each catch arm 9 is swung laterally outwardly to its dotted-line position of Fig. 4, whence the spring 13 is relieved and the hook 10 can be detached from the engaged transverse pin 6.

A vertical shaft 15 is journaled in the main frame 1, and said shaft is carried at its lower end in a bearing 16 on base 3. Intermediate its ends the vertical shaft 15 is journaled in a fixed bearing 17 mounted on the intermediate cross bar 4.

The vertical shaft 15 terminates at its upper end adjacent but below the cross bars 5, and at said upper end the shaft has a hub 18 vertically slidably splined thereon, which hub carries an enlarged circular lower disc 19. The lower disc is matched, in adjacent but spaced relation thereabove, by an upper disc 20, which upper disc is fixed in connection with said top cross bars 5.

The upper disc 20 is formed with a central opening 21, and the depending neck 22 of a hopper 23 extends into said opening 21 in matching relation.

An agitator finger 24 is affixed to the upper end of the vertical shaft 13 and projects upwardly through the neck 22 into the hopper 23; such agitator finger having a laterally bent or canted upper end portion, as shown.

The under side or working face of the upper disc 20 is disposed at a slight downward incline in a radially outward direction, whereby the gap between the lower disc and upper disc 20 progressively decreases in height toward the periphery of said discs.

The upper or working face of the lower disc 19 is formed with a plurality of symmetrically circumferentially spaced radial ribs 25; alternate ones of said ribs being relatively short, as shown.

An annular catch pan 26 surrounds the assembly of the discs 19 and 20 in spaced relation; such catch pan having a sloping bottom 27 which leads to a chute 28. The hub 18 of the lower disc 19 is formed, on one side, with a laterally projecting stub shaft 29 which carries a horizontal-axis roller 30; such roller being of a diameter that it projects at the bottom below the lower end of the hub 18, and there rides on a flat spring ring 31 fixed at circumferentially spaced points, as by riveting 32, to a flat circular head 33 on the upper end of a sleeve 34 through which the vertical shaft 15 extends in turnable relation.

An adjustment screw 35 is threaded vertically through the circular head 33 outwardly of the hub 34 and in alinement below the flat spring ring 31 at a point intermediate the circumferentially spaced connections 32. The screw 35 is adjusted whereby to produce a hump 36 in said ring 31; the height of such hump being variable by manipulation of the screw 35.

At its lower end the sleeve 34 is formed with an annular cam 37 which rests in turnable relation with another or mating annular cam 38 integral with the bearing 17 and fixed with respect to the intermediate cross bar 4.

By part-turning the annular cam 37 on the fixed annular cam 38 the lower disc 19 is vertically adjusted with respect to the upper disc 20, yet without restricting rotation of said lower disc or travel of the roller 30 on the spring ring 31.

The annular cam 37 is turnably adjustable by means of a radial arm 39 which is fixed to and extends from said cam 37. The outer end portion of the radial arm 39 lies over a fixed, slotted quadrant 40 and is adjustably secured to the latter by a wing nut and bolt 41.

The vertical shaft 15 is driven from adjacent its lower end by multiple pulleys 42 having endless drive belts 43 trained thereabout; the belts 43 being driven from an electric motor and reduction gear box unit (not shown).

Dependent on the kind and size of nuts, and whether or not they are pre-hulled, the lower disc 19 is first adjusted relative to the upper disc 20 by setting the radial arm 39.

After such adjustment, and with the vertical shaft 15 driving the lower disc 19 the nuts are fed into the hopper 23, thence delivering downwardly through the neck 22 onto the central portion of the lower disc 19; such downward delivery of the nuts being assured by reason of the agitation produced by the finger 24.

Upon the nuts delivering centrally onto the lower disc 19 they travel outwardly by centrifugal force between the working faces of said discs 19 and 20.

The radially outward convergence of the working faces of the discs 19 and 20 causes a progressively greater pressure to be exerted on the nuts, and such pressure—together with a recurring pulsing or uplifting of the lower disc 19 as the roller 30 rides over the hump 36—produces a most effective nut cracking or shelling action. Also, when the hulls are on the nuts the action is such that the hulls are first broken away from the nuts, and then the latter are cracked as they move outward between the discs 19 and 20 under the influence of the centrifugal action.

The extent of the recurring vertical pulsing of the lower disc 19 is regulated by the adjustment of screw 35; i. e. by the height of the hump 36 relative to the remainder of the ring 31.

The radial ribs 5 on the working face of the lower disc 19 aid in the hulling and shelling action of the machine, and further assure that the nuts are rolled or turned between the discs to enhance the centrifugal discharging action as the nuts move radially outwardly between the convergent working faces of said discs 19 and 20.

After the nuts travel the full distance from the center of the disc assembly to the periphery thereof, the cracked nuts—together with freed hulls if the nuts were unhulled at the outset—discharge into the annular catch pan 26, fall onto the sloping bottom 27, and slide out of the machine through the chute 28 for recovery and separation in suitable apparatus.

The described nut huller and sheller not only works smoothly and positively but has an extremely effective hulling and cracking action by reason of the assembly of the relatively rotating discs 19 and 20 tapering toward their periphery, together with the recurring pulsing axially of one of the discs relative to the other.

From the foregoing description it will be readily seen that there has been produced such a device as will substantially fulfill the objects of the invention, as set forth herein.

While this specification sets forth in detail the present and preferred construction of the device, still in practice such deviations therefrom may be resorted to as do not form a departure from the spirit of the invention, as defined by the appended claims.

Having thus described the invention, the following is claimed as new and useful, and upon which Letters Patent are desired:

1. A nut cracking machine comprising an upstanding frame including a top cross bar, a pair of vertical-axis cracking discs alined in adjacent but spaced relation, said discs being below the top cross bar and the upper disc being fixed thereto, said upper disc having a central opening, a hopper positioned to feed nuts through said opening onto the lower disc, means mounting the lower disc in connection with the frame for rotation and axial adjustment, power means to rotate the lower disc, means to axially adjust the lower disc, and means between the frame and the lower disc and included in part with said last named means responsive to rotation of the lower disc operative to cause the latter to recurringly pulse axially to the same extent irrespective and independent of the axial adjustment of said disc.

2. A nut cracking machine comprising an upstanding frame, a pair of vertical-axis cracking discs alined in adjacent but spaced relation, means to feed nuts between the discs centrally thereof, means securing the upper disc in the frame, a driven shaft upstanding from below the lower disc, the latter being mounted on the shaft for rotation therewith but axially slidable, a normally stationary ring supported from the frame about the shaft below said lower disc, said ring having a hump therein, a member on the lower disc riding the ring, said member upon passage over the hump causing the lower disc to pulse axially relative to the upper disc.

3. A nut cracking machine comprising an upstanding frame, a pair of vertical-axis discs alined in adjacent but spaced relation with radially outwardly converging faces, means securing the upper disc in the frame, means to feed nuts between the discs centrally thereof, a driven shaft upstanding from below the lower disc, the latter being secured to the shaft for rotation therewith but axially slidable, a ring about the shaft below said lower disc, said ring having a hump therein, a member on the lower disc riding the ring, said member upon passage over the hump causing the lower disc to pulse axially relative to the upper disc, a sleeve about the shaft on the upper end of which the ring is fixed, and means to vertically adjust said sleve while normally maintaining the same stationary.

4. A nut cracking machine, as in claim 3, in which said last named means includes cooperating side-face cams with spiral faces, one being included on and rigid with the sleeves and the other being fixed to the frame, a radial arm projecting from the sleeve, and means between the arm and frame to adjust the rotative position of said arm.

5. A machine, as in claim 3, with means between the sleeve and ring to alter the effective height of the ring hump.

6. A machine, as in claim 5, in which the ring is secured on the sleeve at a point substantially opposed to the hump, and said last named means comprises an adjustable set screw mounted in the sleeve below the hump and engaging the under side of said hump.

7. A nut cracking machine comprising an upstanding frame, a pair of vertical-axis cracking discs alined in adjacent but spaced relation, means securing the upper disc in the frame, means to feed nuts between the discs centrally thereof, a driven shaft upstanding from below the lower disc, the latter being mounted on the shaft for rotation therewith but axially movable, a vertically movable sleeve about the shaft below said lower disc, means between said sleeve and lower disc to impart a vertical pulsating movement to said lower disc upon rotation of the shaft, and means to adjust the sleeve vertically while normally holding the same stationary.

8. A nut cracking machine comprising an upstanding frame which includes opposed posts, a pair of vertical-axis cracking discs disposed between the posts in adjacent but spaced relation, the upper discs having a central opening, a feed hopper rigid with the upper disc and projecting upwardly from said opening, means to drive the lower disc, cross bars fixed on the hopper adjacent the upper disc and straddling the posts, elements connecting the posts and slidably guiding the same on said posts, tension springs between said elements and the posts below said bars pulling down on the bars, and stops on the posts limiting downward movement of the bars.

9. A machine, as in claim 8, with releasable connecting means between the springs at their upper end and the posts; the bars being movable upwardly and clear of the posts when the springs are released whereby said bars, the upper disc, and hopper may be withdrawn as a unit from over the lower disc to expose the latter in the clear.

ALFRED D. GOODWIN.

References Cited in the file of this patent

UNITED STATES PATENTS

| Number | Name | Date |
|---|---|---|
| 20,121 | Winter | Apr. 27, 1858 |
| 317,359 | Hodge | May 5, 1885 |
| 918,014 | Cooper | Apr. 13, 1909 |
| 1,335,465 | Sparks | Mar. 30, 1920 |
| 1,427,457 | Gillespie | Aug. 29, 1922 |
| 1,574,138 | Vaughn | Feb. 23, 1926 |

FOREIGN PATENTS

| Number | Country | Date |
|---|---|---|
| 14,358 | Great Britain | of 1853 |
| 572,303 | France | Feb. 18, 1924 |
| 117,220 | Australia | July 1943 |